United States Patent
Ham

(10) Patent No.: US 10,046,678 B2
(45) Date of Patent: Aug. 14, 2018

(54) SHOCK ATTENUATING MOUNTING

(71) Applicant: Wolfstone Technology Ltd, Salisbury, Wiltshire (GB)

(72) Inventor: Neil Ham, Salisbury (GB)

(73) Assignee: WOLFSTONE TECHNOLOGY LTD, Salisbury (GB)

( * ) Notice: Subject to any disclaimer, the term of this patent is extended or adjusted under 35 U.S.C. 154(b) by 0 days.

(21) Appl. No.: 14/422,073

(22) PCT Filed: Aug. 16, 2013

(86) PCT No.: PCT/GB2013/052180
§ 371 (c)(1),
(2) Date: Feb. 17, 2015

(87) PCT Pub. No.: WO2014/027206
PCT Pub. Date: Feb. 20, 2014

(65) Prior Publication Data
US 2015/0231996 A1    Aug. 20, 2015

(30) Foreign Application Priority Data

Aug. 16, 2012 (GB) .................................. 1214633.8

(51) Int. Cl.
| | | |
|---|---|---|
| *B60N 2/427* | (2006.01) | |
| *B60N 2/54* | (2006.01) | |
| *F16F 1/377* | (2006.01) | |

(52) U.S. Cl.
CPC ......... *B60N 2/42736* (2013.01); *B60N 2/542* (2013.01); *F16F 1/377* (2013.01)

(58) Field of Classification Search
CPC combination set(s) only.
See application file for complete search history.

(56) References Cited

U.S. PATENT DOCUMENTS

| | | | | |
|---|---|---|---|---|
| 1,108,488 A | * | 8/1914 | Bugg | ................... F16F 9/0418 |
| | | | | 267/140.4 |
| 1,811,923 A | * | 6/1931 | Flintermann | .......... B60N 2/502 |
| | | | | 267/292 |
| 2,554,490 A | * | 5/1951 | Eames | ..................... A47C 3/00 |
| | | | | 297/285 |
| 4,057,214 A | | 11/1977 | Harder, Jr. | |

(Continued)

FOREIGN PATENT DOCUMENTS

| | | |
|---|---|---|
| DE | 4325754 A1 | 2/1995 |
| FR | 1335575 A | 8/1963 |

(Continued)

OTHER PUBLICATIONS

United Kingdom Search Report issued in corresponding application No. GB1214633.8 dated Nov. 15, 2012.
Written Opinion and International Search Report issued in corresponding application No. PCT/GB2013/052180 dated Jan. 7, 2014.

*Primary Examiner* — Philip F Gabler
(74) *Attorney, Agent, or Firm* — Carter, DeLuca, Farrell & Schmidt, LLP

(57) ABSTRACT

A shock attenuating mounting for a seat, comprising an attenuating element composed of resilient material, the element securable on a first side to a seat and securable on a second side to a vehicle, the element configured to attenuate shock experienced by the vehicle along more than one axis.

13 Claims, 8 Drawing Sheets

(56) References Cited

U.S. PATENT DOCUMENTS

| | | | | |
|---|---|---|---|---|
| 4,062,585 | A | * | 12/1977 | Herring, Jr. ................ B62J 1/26 248/634 |
| 4,215,841 | A | * | 8/1980 | Herring, Jr. ............ B60N 2/502 248/635 |
| 4,523,730 | A | * | 6/1985 | Martin .................... B64D 25/04 244/122 R |
| 4,832,404 | A | * | 5/1989 | Baymak ............. B64D 11/0691 280/808 |
| 5,344,212 | A | * | 9/1994 | Muller .................... B60N 2/28 297/14 |
| 5,692,705 | A | | 12/1997 | Bellais |
| 5,876,085 | A | * | 3/1999 | Hill ........................ B60N 2/542 296/65.02 |
| 6,237,889 | B1 | | 5/2001 | Bischoff |
| 6,647,916 | B2 | * | 11/2003 | Neese ..................... B63B 29/04 114/363 |
| 7,731,287 | B2 | | 6/2010 | Manfredotti |
| 9,022,462 | B2 | * | 5/2015 | Johnson ................. B64D 11/06 244/118.5 |
| 2010/0270836 | A1 | | 10/2010 | Mowry et al. |
| 2011/0241391 | A1 | | 10/2011 | Lamparter et al. |
| 2012/0098174 | A1 | | 4/2012 | Ruan et al. |
| 2012/0133184 | A1 | * | 5/2012 | Himmelhuber .......... B60N 2/50 297/338 |

FOREIGN PATENT DOCUMENTS

| | | | |
|---|---|---|---|
| GB | 622620 | A | 5/1949 |
| GB | 2009881 | A | 6/1979 |
| GB | 2424362 | A | 9/2006 |
| GB | 2481202 | A | 12/2011 |
| WO | 2011/150501 | A1 | 12/2011 |

* cited by examiner

SHOCK ATTENUATING MOUNTING

In military vehicles, such as personnel carriers, it is known to provide occupant (crew) seating with a mechanical shock attenuating mounting between the seat and the vehicle. The mounting is provided to attenuate severe shocks, such as those caused by a blast under the vehicle.

A known shock attenuating mounting comprises a sacrificial mechanical element. In one known arrangement, the seat base is pivotably mounted at one end to the side wall of the vehicle structure. Additionally, a sacrificial fracture arm (or an arm with a sacrificial elbow) is secured between the seat base and the side wall of the vehicle, away from the pivoting mounting, maintaining the seat base in a substantially horizontal plane. In normal use, the seat base provides a sturdy support for an occupant.

When a shock above a predetermined threshold acting upwards through the vehicle is experienced, the reactionary force exerted on the seat by the occupant causes the fracture arm/elbow to deform, thereby lessening (attenuating) some of the shock imparted on the occupant. Such an arrangement helps to reduce the chance of injury to the occupant of the seat.

An alternative sacrificial attenuating mounting comprises an inner tube received in an outer tube with an interference fit. The tube assembly is provided substantially vertically between the seat and the vehicle base. When a force above a predetermined threshold is imparted on the mounting, the inner tube is forced into the outer tube. The force causes either or both of the inner and outer tubes to deform and/or shear, thereby attenuating energy. A still further arrangement may use a mechanical arm and spring arrangement or conventional hydraulic or pneumatic piston arrangement.

Known shock attenuating mountings are designed to attenuate the shock caused by an improvised explosive device (IED) being detonated directly beneath the vehicle. When used in helicopter crew seating, the shock attenuating mountings may alternatively be provided to reduce injury to crew in the event of an emergency landing where the fuselage impacts the grounds with significant velocity. Such shock attenuating mountings may be used in numerous types of vehicle, such as air, land or water-going vehicles/vessels.

Regardless of the intended use, the sacrificial nature of known mechanical shock attenuating mountings means that they are 'single use' items. Even if the sacrificial element has only partially deformed after being subjected to a first shock, it will likely not be in an optimal condition to sufficiently attenuate a subsequent shock(s). The sacrificial element therefore needs to be replaced when subjected to a shock/force over a predetermined level.

The force created by an IED exploding beneath a vehicle is often sufficient to cause the vehicle to leave the ground, particularly in the case of lightweight vehicles. When a vehicle is caused to leave the ground, the subsequent 'slam down'—as the vehicle contacts the ground again—creates an additional shock of a level which may cause (further) injury to occupants. Therefore, both the initial blast shock and slam down can cause injury to occupants.

Furthermore, depending on factors such as the location and/or characteristics of the IED and/or the velocity of the vehicle at the time of detonation, the vehicle may not remain in a vertical orientation following the initial blast. The shock created by the slam down may therefore be imparted on the seating in a different direction to the initial shock caused by the blast, further reducing the effectiveness of the mounting.

Known mechanical sacrificial shock attenuating mountings, such as those described above, are not suitable to effectively attenuate multiple shocks, such as those caused by an initial blast and the subsequent slam down. Moreover, known mountings are only designed and suitable to attenuate shocks acting in a vertical direction.

Accordingly, the present invention provides a shock attenuating mounting for a seat, comprising an attenuating element composed of resilient material, the element securable on a first side to a seat and securable on a second side to a vehicle, the element configured to attenuate shock experienced by the vehicle along more than one axis.

The present invention further provides a vehicle, shock attenuating mounting or seating arrangement according to the appended claims.

Embodiments of the present invention will now be described, by way of non-limiting examples, with reference to the figures, in which.

Figure 3A:
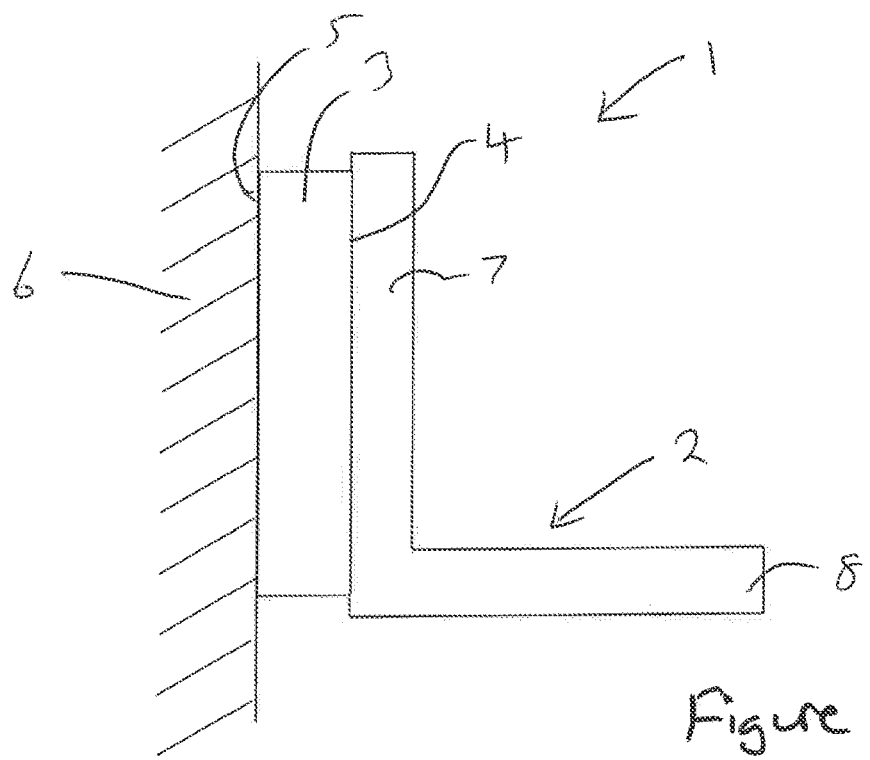
Figure 3B:
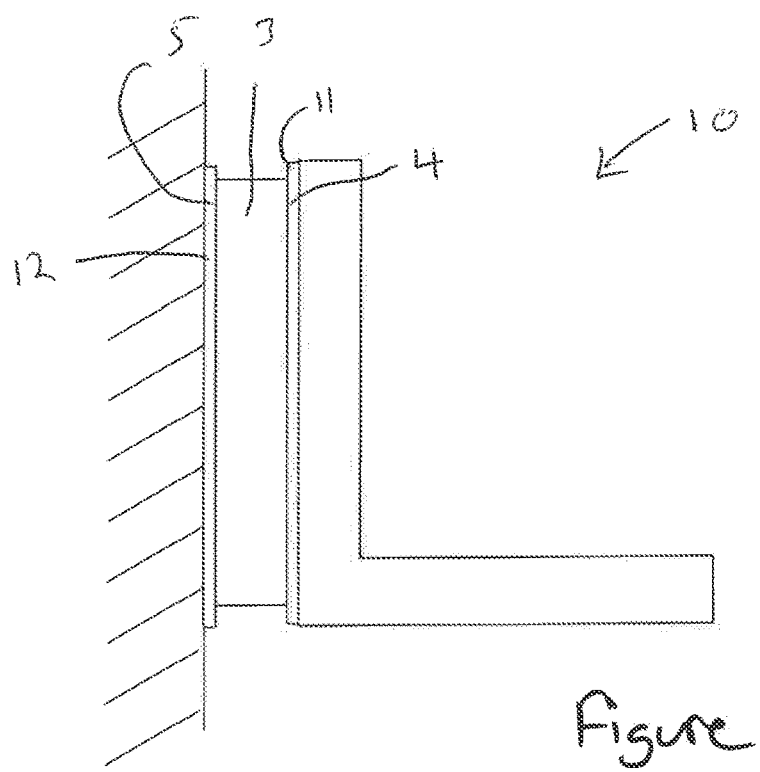
Figure 4:
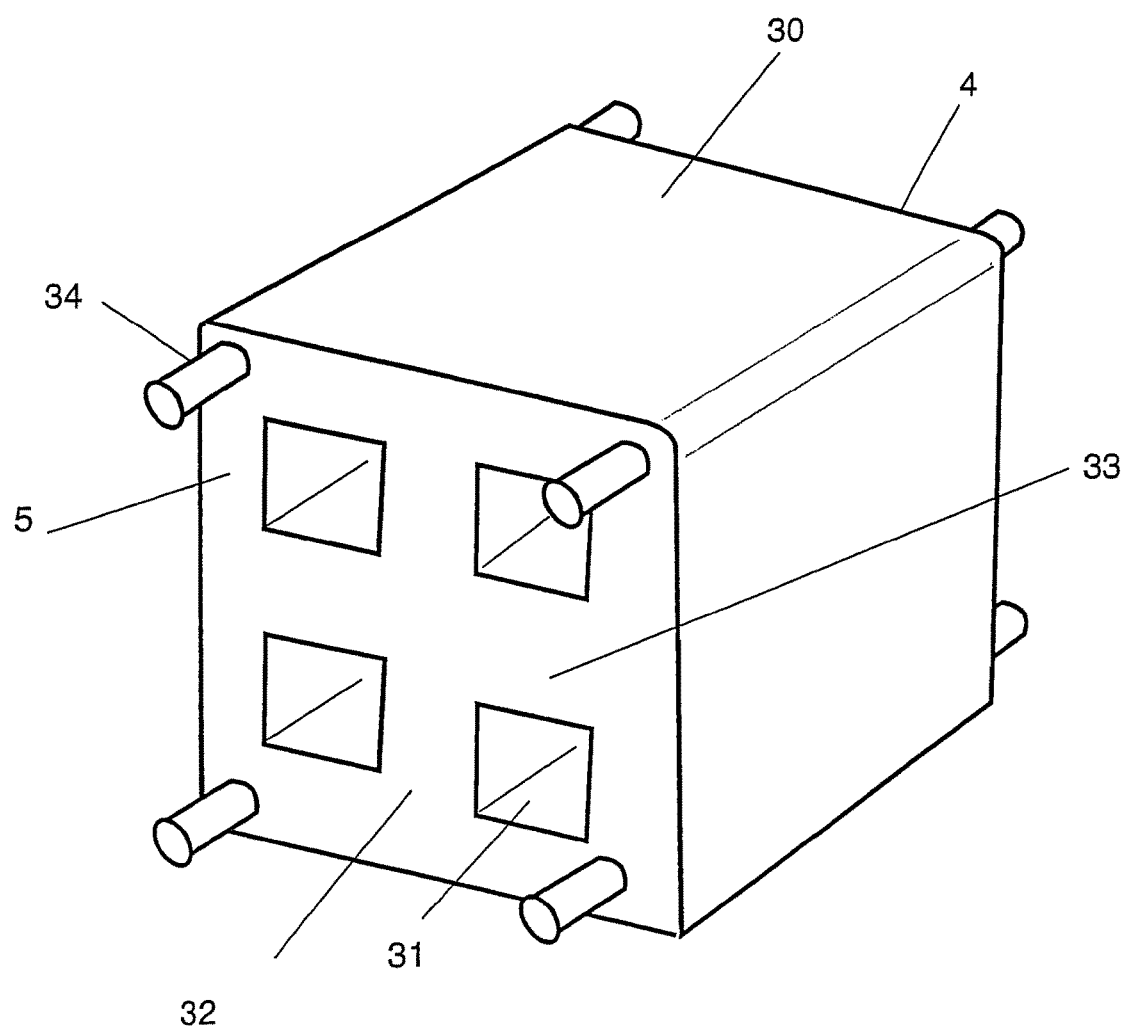
Figure 5B:
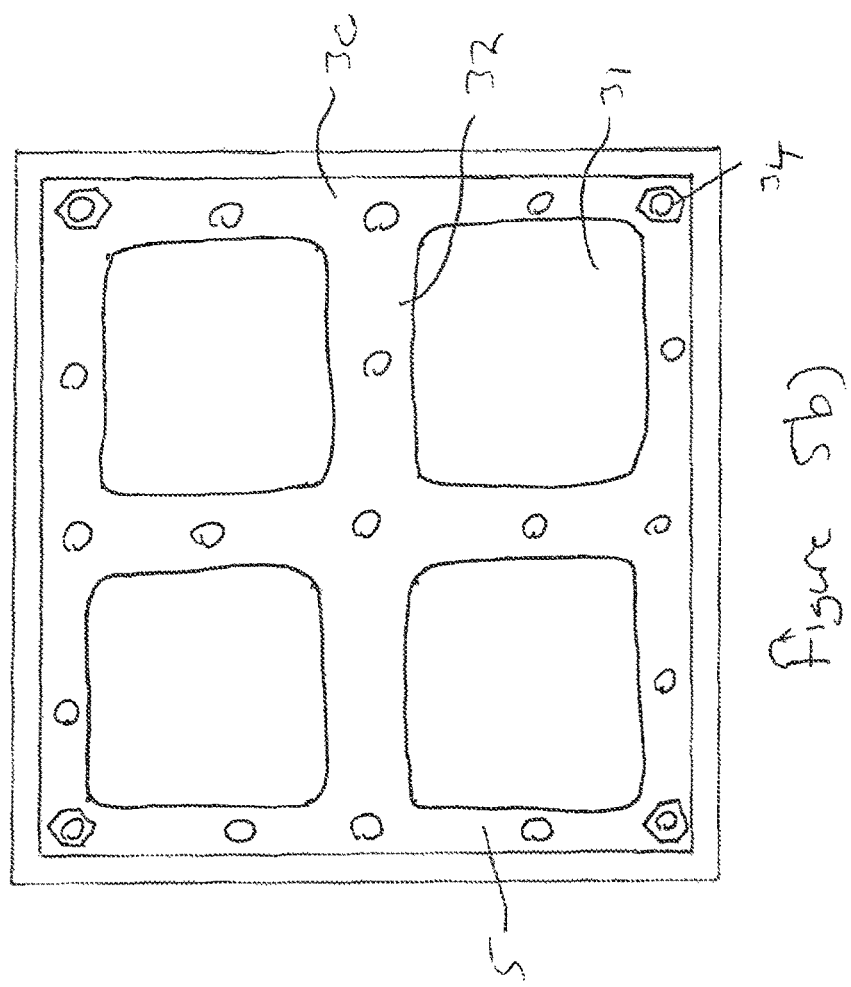
Figure 5A:
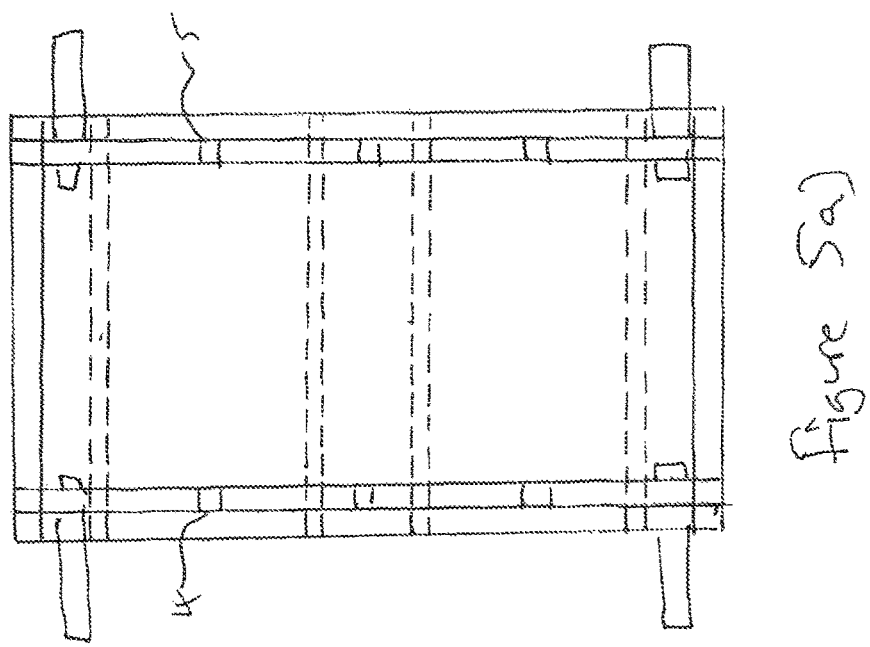

FIG. 3a schematically illustrates a shock attenuating mounting according to one embodiment of the present invention;

FIG. 3b schematically illustrates a shock attenuating mounting according to another embodiment of the present invention;

FIG. 4 is a perspective view of an attenuating element of an embodiment of the present invention;

FIG. 5a is a side view of the element of FIG. 4;

FIG. 5b is a front view of the element of FIG. 4.

Figure 6A:
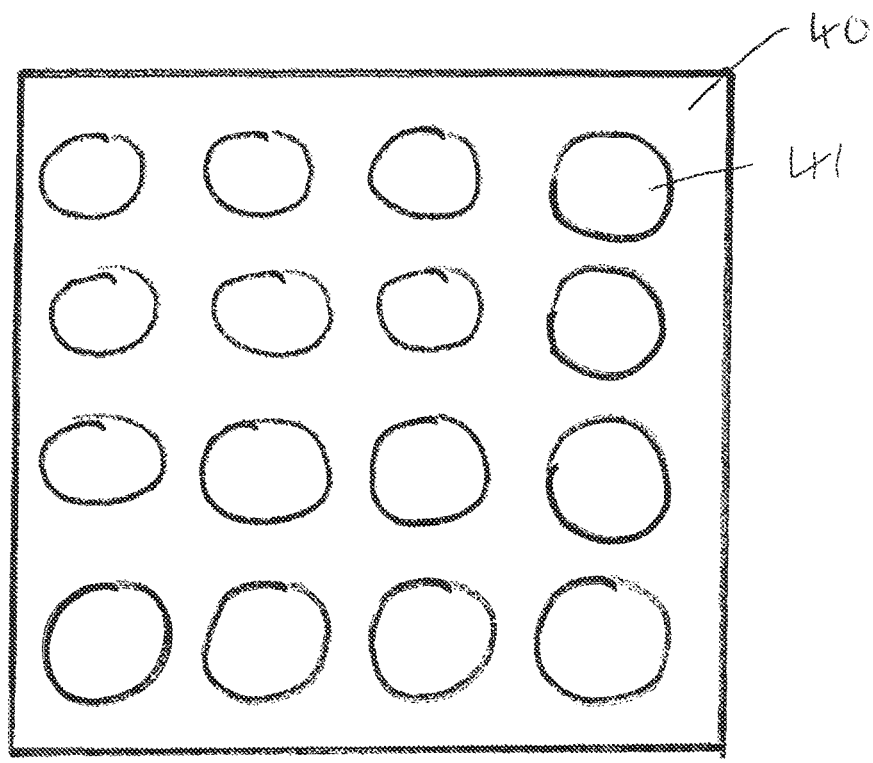
Figure 6B:
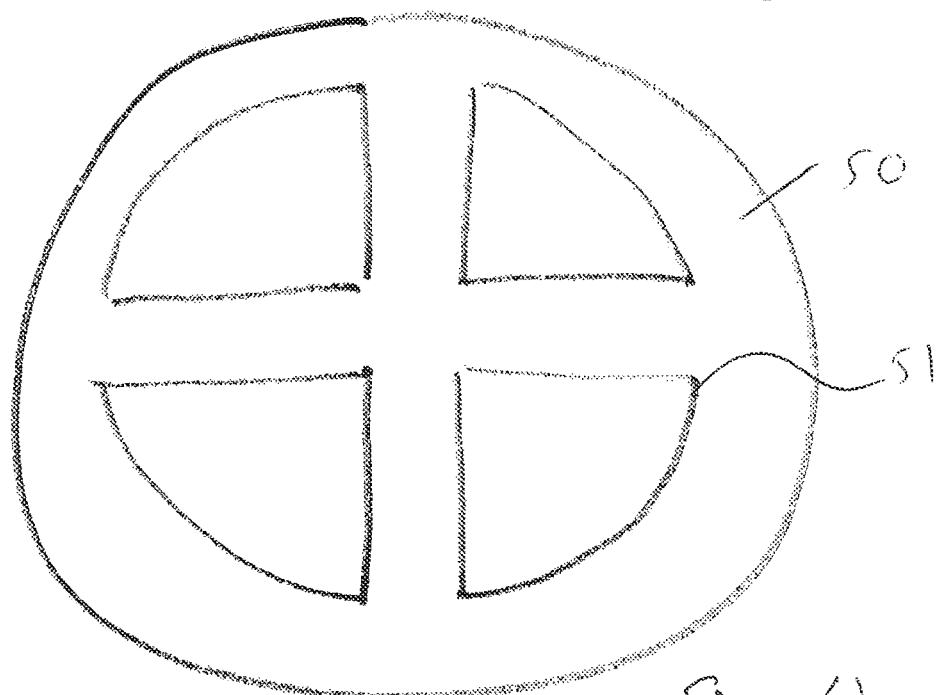
Figure 7A:
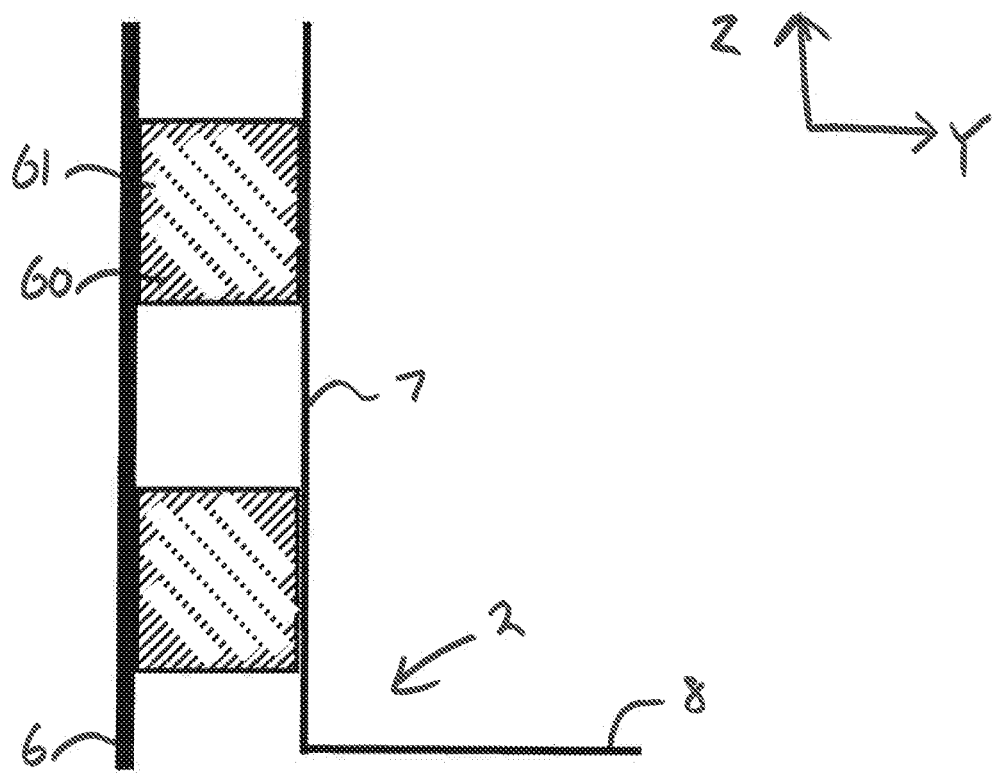
Figure 7B:
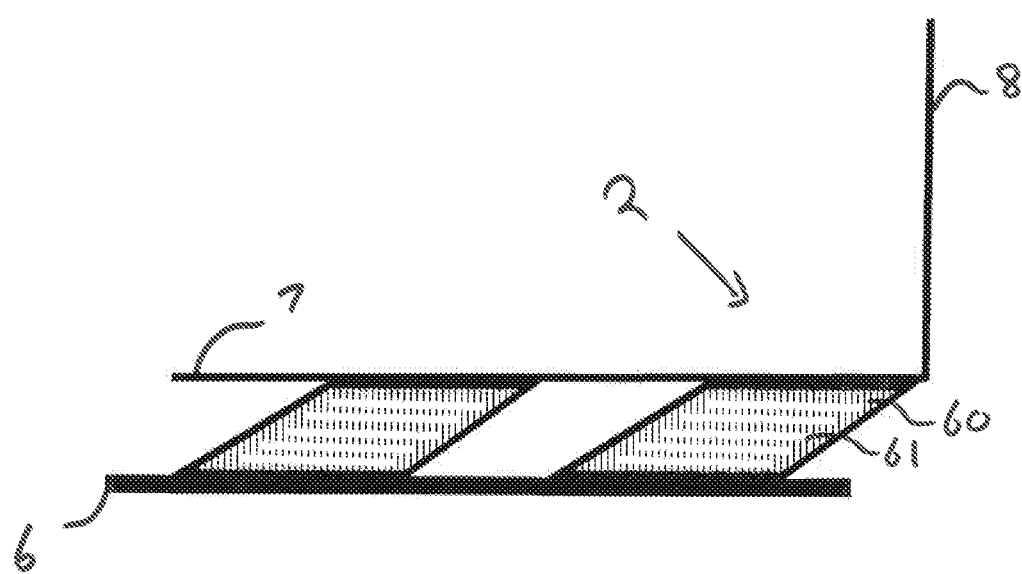
Figure 8:
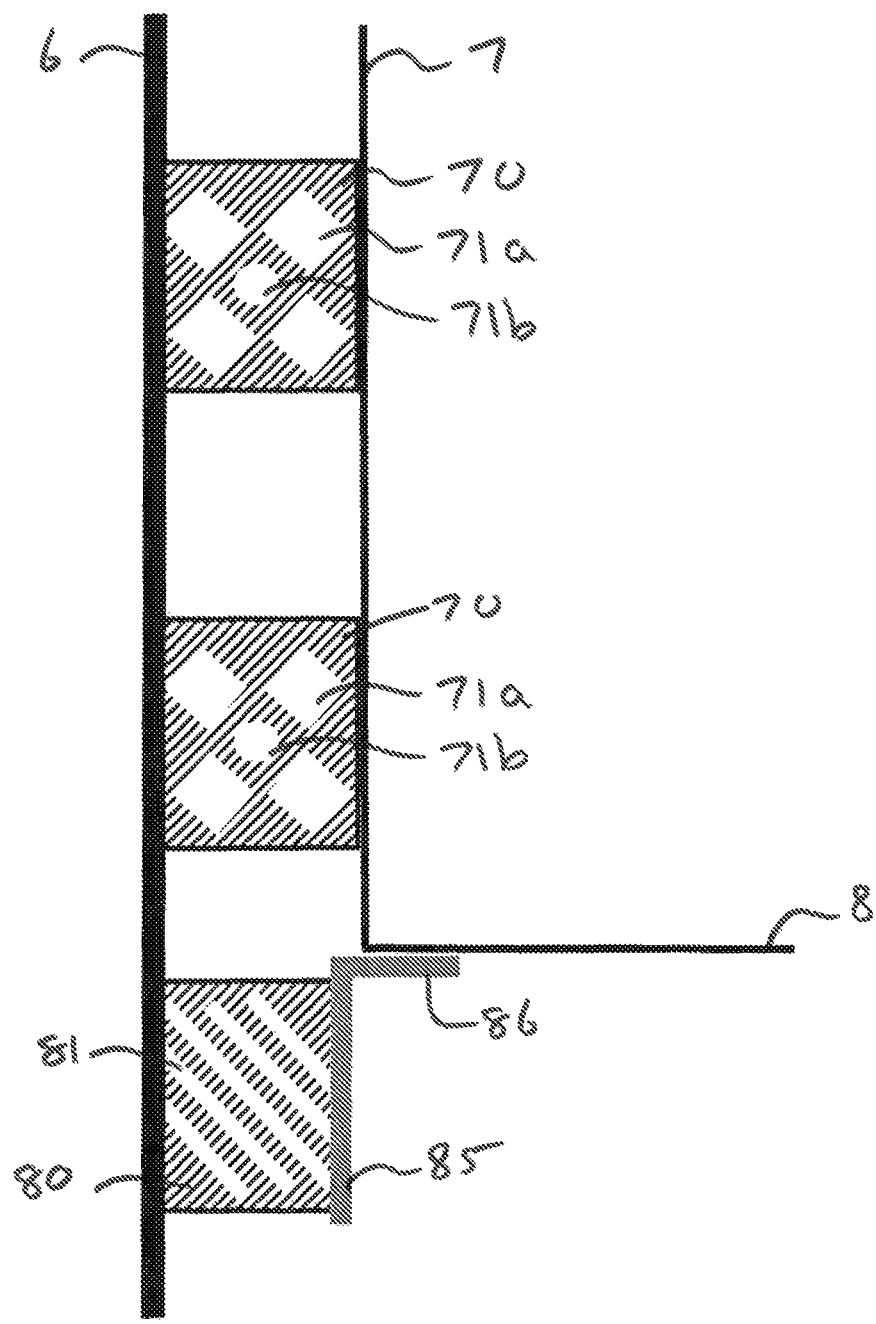
Figure 9:
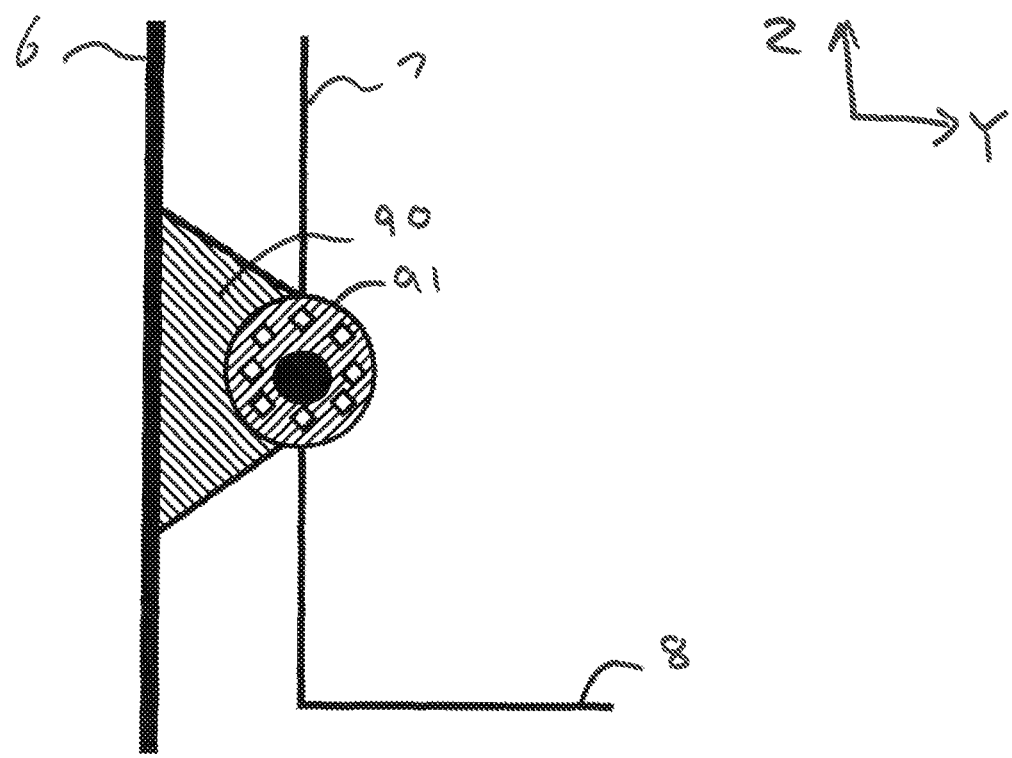
Figure 10:
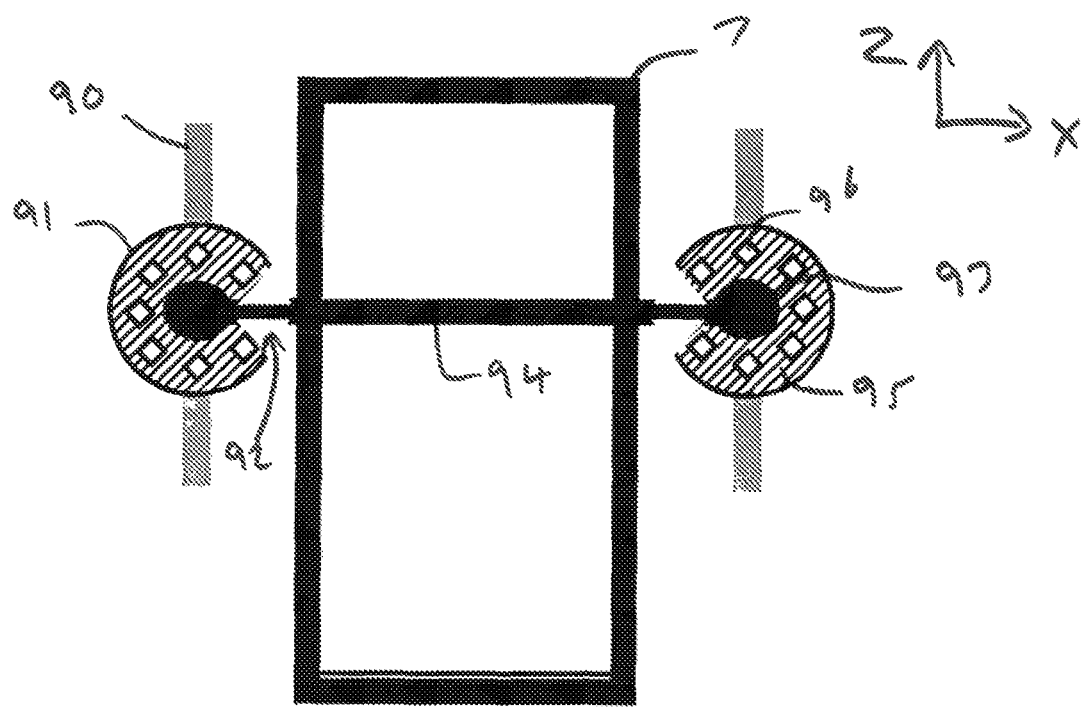

FIG. 6a shows an alternative attenuating element;

FIG. 6b shows a further alternative attenuating element;

FIG. 7a shows a further alternative attenuating element;

FIG. 7b shows the arrangement of FIG. 7a in use;

FIG. 8 shows a still further alternative attenuating element;

FIG. 9 shows a side view, in cross-section, of another embodiment of the present invention; and FIG. 10 shows a front view in cross-section, of the arrangement of FIG. 9.

Figure 1:
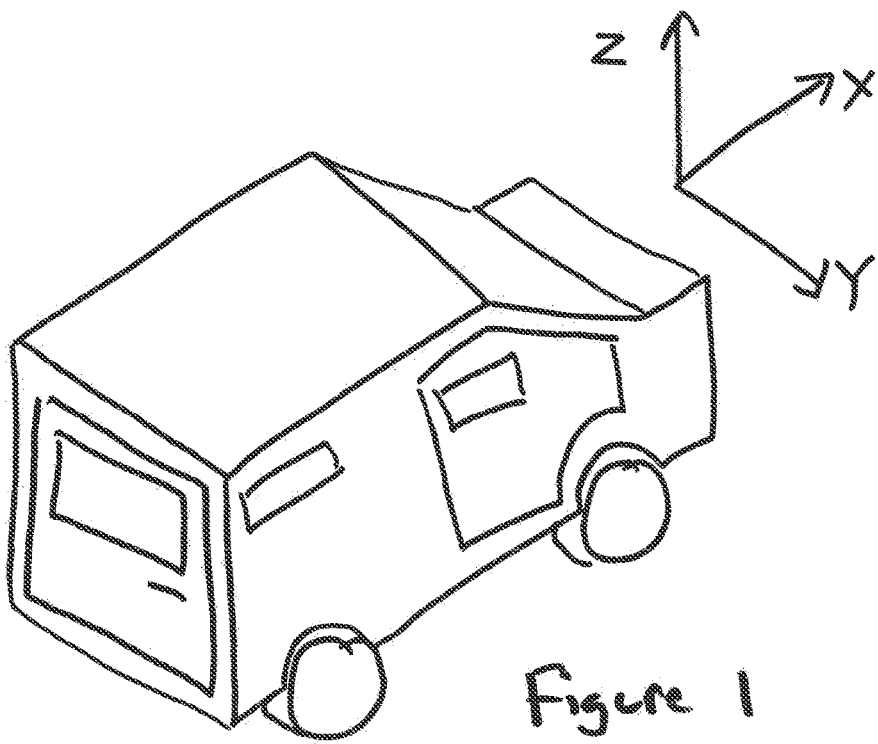
FIG. 1 shows a perspective view of a vehicle with which the invention may be used.

A vehicle with which the present invention may be used is shown in FIG. 1. A set of co-ordinate axes is shown, wherein the X axis corresponds with the longitudinal axis of the vehicle. This may be referred to as the "crash plane", since it is the direction along which a force will act should the vehicle collide with an object in its normal direction of travel. The Y axis is horizontal and perpendicular to the X axis. Finally, the Z axis is the vertical axis. Known shock attenuating mountings are designed only to attenuate shocks occurring along the Z axis.

Figures 2A, 2B:
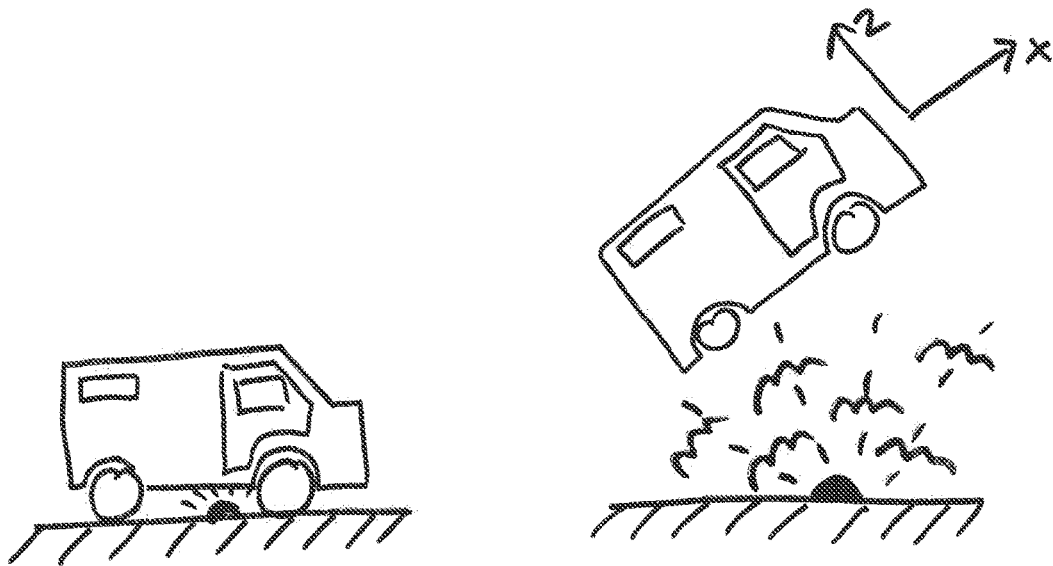
FIG. 2a illustrates a vehicle travelling over an IED.
FIG. 2b illustrates the vehicle leaving the ground following the detonation of the IED.

As illustrated in FIGS. 2a and 2b, when the vehicle travels over an explosive device (IED), the shockwave created by the explosive device may cause the vehicle to lift off the ground, particularly in the case of lightweight vehicles. As the vehicle lifts from the ground, the orientation of the vehicle with respect to the ground will likely change. It will be appreciated from FIG. 2b that, as the vehicle contacts the ground, ("slam down"), the force of the impact will have an element along the X axis as well as an element along the Z axis. If the vehicle has rotated about its longitudinal (X) axis, there will also be an element of force along the Y axis.

FIG. 3a shows a shock attenuating mounting 1 for a seat 2 comprising an attenuating element 3 composed of resilient material. The element 3 is secured on a first side 4 to a seat 2 and secured on a second side 5 to a vehicle 6. Both the first 4 and second 5 sides are parallel with the X-Z plane (when mounted to the side wall of a vehicle). The seat 2 comprises a seat back 7 and seat base 8. The element 3 is configured to attenuate shock experienced by the vehicle 6 along more than one axis and is multidirectional. Preferably, the element is configured to attenuate shock experienced by the vehicle 6 along at least the Z axis.

In known crew seating, the backs 7 of the seats 2 are secured to the side walls of the vehicle 6, such that an occupant sitting in the seat will generally be facing along the Y axis. Accordingly, should the vehicle 6 be involved in a collision, the force of the impact will generally be directed along the X axis (crash plane). Preferably, an attenuating element 3 of a shock attenuating mounting; according to the present invention is also configured to attenuate shock experienced in the X axis; in addition to the Z axis.

Preferably, the element 3 of the present invention is also configured to attenuate shock in the Y axis, such that the element 3 effectively attenuates shock in all directions. The resilient material has multidimensional shock attenuation, such that it can simultaneously attenuate shocks occurring along all axes.

In one embodiment, the extent of attenuation along a first axis is different to the extent of attenuation along a second axis. For example, with reference to FIG. 3*a*, in which the seat back 7 is secured to the side wall of the vehicle 6, the element 3 may be configured to attenuate shock along both the X and Z axes more than a shock along the Y axis. The different levels of attenuation may depend on factors such as the dimensions of the attenuating element 3 and/or the mechanical properties of the attenuating element 3.

The element 3 may be a unitary item of substantially uniform density. The attenuating characteristics along a particular axis may depend on the dimensions of the attenuating element 3 along that axis.

With respect to FIG. 3*a*, in one embodiment the element 3 is adhered to the vehicle 6 and the seat back 7 on both sides. In the embodiment shown, the interface between the element 3 and vehicle 6/seat back 7 is planar. It will be appreciated that forces along the X and Z axes create shear forces along this interface. To prevent or reduce undesired separation of the element 3 from the vehicle 6/seat back 7, the interface may be non-planar. For example, the interface may be curved or undulating, or may be provided with multiple keying protrusions across the interface. In one embodiment, the element 3 is physically keyed to at least one of the vehicle 6 and seat back 7, so as to be less affected by any shear forces acting along the plane of the interface.

FIG. 3*b* illustrates another shock attenuating mounting 10 embodying the present invention, comprising a first mounting plate 11 secured to the first side 4 of the element 3 and a second mounting plate 12 secured to the second side 5 of the element 3. Preferably, the element 3 is permanently secured to both the first 11 and second 12 plates. The first plate 11 may be secured to the seat 2 by mechanical fixing means through apertures in the plate; for example bolts or rivets. The second plate 12 may be secured to the vehicle 6 by similar means. Alternatively, the resilient element 3 may be secured directly to the seat back 7, with only a single mounting plate 12 secured to the second side 5 of the element 3, for removably fixing the shock attenuating mounting to the vehicle 6.

The shock attenuating mounting 1, 10 may be provided with a flexible cover (not shown) to prevent the ingress of foreign particles and/or liquid.

An exemplary attenuating element 30 of resilient material is shown in FIG. 4. The element comprises four apertures 31 passing there-through, from the first surface 4 to a second surface 5. The plurality of apertures 31 create vertical 32 and horizontal 33 ribs, which serve to affect the attenuating behaviour of the attenuating element 30. The element 30 shown in FIG. 4 further comprises protrusions 34 which are received in corresponding apertures of the seat back (or first mounting plate) and the vehicle (or second mounting plate) respectively, so as to mechanically key the element to the surrounding structure.

Preferably, the material of the element is an elastomer.

The dimensions and structure of the attenuating element may be different to that shown in FIG. 4. For example, a different number and/or form of apertures may be adopted, thus affecting the number of ribs created within the element. In another embodiment, the element may be composed of a single, uniform density, piece of resilient material, without any apertures. In a still further embodiment, the resilient element may comprise a honeycomb type structure.

FIG. 6*a* schematically illustrates an attenuating element 40 according to another embodiment. As compared to the square apertures 31 of FIG. 4, the attenuating element 40 of FIG. 6*a* comprises a plurality of circular apertures 41. FIG. 6B schematically illustrates an attenuating element 50 according to a further embodiment. The attenuating element 50 is circular, and the apertures 51 comprise sectors.

In the embodiments described above, the apertures extend from the first side 4 to the second side 5; in other words, along the Y axis.

In an alternative embodiment, the apertures may extend through the attenuating element along a different axis. FIG. 7*a* illustrates an attenuating element 60 in which the apertures 61 extend along the X axis (when the seat is mounted to the side wall of a vehicle). The apertures 61 therefore extend from a first side surface through the attenuating element 60 to a second side surface. The apertures 61 shown in FIG. 7 are slots, arranged at an angle, preferably 45 degrees, to the X-Y plane.

Providing apertures 31 extending along the Y axis (as in FIG. 4) affects the resiliency of the element 30 in response to forces acting along the X and Z axes. The apertures 31 may not affect the resiliency of the element 30 along the Y axis to the same extent.

Providing apertures 61 (slots) extending along the X axis (as in FIG. 7*a*) affects the resiliency of the element 60 in response to forces acting along the Y and Z axes. The apertures 61 may not affect the resiliency of the element 60 along the X axis to the same extent. The cross-sectional area of the aperture 61, in the Y-Z plane is likely to affect the resiliency along the X axis to a greater extent than the geometry and configuration of the apertures 61. Accordingly, the attenuating element 60 of FIG. 7 has been found to demonstrate suitable resiliency, and thus attenuation, along all axes.

A benefit of the arrangement of FIG. 7*a* is that the apertures 61 allow the attenuating element 60 to 'lozenge' within the Z-Y plane, as shown in FIG. 7*b*. By allowing the attenuating element 60 to deform in this way, a greater level of attenuation can be achieved. Lozenging may be promoted by the use of a plurality of attenuating elements 60 rather than a single attenuating element. FIG. 7*b* illustrates a situation in which the vehicle impacts the ground on its side (where the seat 2 is mounted to the side wall of the vehicle). This situation may occur when the mounting of the present invention is adopted in the side-wall crew seating in a helicopter.

FIG. 8 schematically illustrates a further arrangement, comprising at least one first attenuating element 70 and a second attenuating element 80. First 71*a* and second 71*b* apertures extend along the X axis of the first attenuating element 70. Preferably, the first apertures 71a have a diamond cross section. The second aperture 71b has a circular cross-section. The cross-section is not essential.

The behaviour of the attenuating element 70 can be affected by configuring the number, size and shape of the apertures 71a, 71b provided therein.

The arrangement of FIG. 8 further comprises a seating support bracket 85, having a sacrificial seat rest 86. The seating support bracket 85 is connected to the side of the vehicle with a second attenuating element 80, comprising slotted apertures 81. Preferably, the level of attenuation offered by the first attenuating element 70 is different to that offered by the second attenuating element 80.

The form of the second attenuating element 80 is preferably the same as the attenuating element 60 shown in FIGS. 7a and 7b. In normal operation, there is preferably a small gap between the underside of the seat base 8 and the seat rest 86, to allow the seat base 8 to translate, at least to some extent, along the X and Y axes, without being affected by the resiliency of the attenuating element 80.

A benefit of the arrangement shown in FIG. 8 is that greater attenuation may be achieved along the Y axis, owing to the increased size of the apertures 71a, 71b, whilst constraining movement of the seat along the Z axis. When a force over a predetermined level is experienced along the Z axis, the seat rest 86 perishes and allows translation of the seat 2 with respect to the Z axis. However, any movement is then attenuated by the combined effects of the first attenuating elements 70 and the second attenuating element 80.

FIGS. 9 and 10 show a further shock attenuating mounting for a seat embodying the present invention. As shown in FIG. 9, the mounting comprises an armature 90 attached to the side wall 6 of the vehicle. An outer spherical housing 91 is attached to the armature 90. The surface of the outer spherical housing 91 is almost entirely continuous, apart from an opening 92, as shown in FIG. 10 in cross-section. A mounting 94 is attached to the seat 7. At either end of the mounting 94 is provided an inner ball 93. The inner ball 93 is received within the outer spherical housing 91 and an attenuating element 95 is disposed between the ball 93 and the outer spherical housing 91. Preferably, the attenuating element 95 is bonded to at least one of the inner surface of the outer spherical housing 91 or the outer surface of the ball 93. The attenuating element 95 further comprises a plurality of voids or recesses 96. The voids or recesses 96 have a similar function to the apertures 61, 81 illustrated in FIGS. 7a-8.

It will be appreciated from the arrangement illustrated in FIGS. 9 and 10 that the attenuating element attenuates forces in all axes. The level of attenuation in a predetermined axis may be configured by adjusting the distribution number, form and/or size of the voids or apertures 96 within the attenuating element 95.

The attenuating element may be comprised of multiple materials, each having predetermined different mechanical properties. For example, a first material may have a first predetermined resiliency, a second material may have a second predetermined resiliency, etc. The attenuating element may comprise discrete sections formed of a respective one of a first, second etc material.

In one embodiment, wherein the resilient material of the attenuating element comprises apertures, at least one element of a different material is inserted into at least one of the apertures. If the material of the element inserted in the aperture is different to the material of the main attenuating element, the behaviour and response of the attenuating unit will be different.

The shock attenuating mounting may comprise a single attenuating element or a plurality of attenuating elements mounted between the seat and vehicle.

Preferably, the resilient material is configured so as not to exhibit a truly elastic response but is configured to provide effective damping throughout multiple shock events. In one embodiment, the resilient material may provide an effective combination of memory and elasticity properties.

With prior art shock attenuating mountings, manufacturers and operators have been heavily focussed on the initial blast event, and not concerned with the subsequent slam down shock or associated crash event. Existing test acceptance criteria for shock attenuating seating is based only a static condition. The shock attenuating mounting of the present invention is not only operable to attenuate multiple shocks (initial blast and slam down) but is also able to attenuate non-vertical shocks, such as those experienced when the vehicle crashes whilst moving (a "dynamic" shock event)

Although a seat having a seat back and seat base has been described, this is not essential. The shock attenuating mounting may be mounted between a seat base and the vehicle only.

When used in this specification and claims, the terms "comprises" and "comprising" and variations thereof mean that the specified features, steps or integers are included.

The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A seating arrangement for a vehicle, comprising:
a seat; and
at least one shock attenuating mounting,
wherein the seat comprises a seat back and seat base, and
wherein the shock attenuating mounting comprises an attenuating element composed of resilient material, the attenuating element including a first side directly attached to the seat back and a second side directly attached to a vertically-extending surface of the vehicle, the attenuating element configured to attenuate shock experienced by the vehicle along more than one axis,
wherein the seat base has no direct support from a horizontally-extending surface of the vehicle.

2. The seating arrangement according to claim 1, wherein the attenuating element is configured to attenuate shock along two axes.

3. The seating arrangement according to claim 1, wherein the attenuating element is configured to attenuate shock in all directions.

4. The seating arrangement according to claim 1, wherein an extent of attenuation along a first axis is different to an extent of attenuation along a second axis.

5. The seating arrangement according to claim 1, wherein the resilient material is an elastomer.

6. The seating arrangement according to claim 1, wherein the attenuating element is a unitary item.

7. The seating arrangement according to claim 1, wherein the attenuating element has a substantially uniform density.

8. The seating arrangement according to claim 1, wherein the attenuating element comprises at least one void.

9. The seating arrangement according to claim 1, wherein the attenuating element has a honeycomb type structure.

10. The seating arrangement according to claim 1, wherein the attenuating element comprises a unitary block having a plurality of parallel apertures extending therethrough, defining a plurality of ribs therebetween.

11. A vehicle having at least one seating arrangement according to claim 1.

12. The seating arrangement according to claim 1, wherein force from the shock experienced by the vehicle is substantially along a length of the attenuating element parallel to the seat back, and wherein the shock is attenuated through shearing of the attenuating element.

13. The seating arrangement according to claim 12, wherein shocks to the vehicle are attenuated based on a position of the attenuating element.

\* \* \* \* \*